June 11, 1940.  D. N. HIMES  2,204,040

NUT CRACKER

Filed May 4, 1939

David N. Himes
INVENTOR

BY Victor J. Evans & Co.
ATTORNEYS

Patented June 11, 1940

2,204,040

UNITED STATES PATENT OFFICE 2,204,040

NUT CRACKER

David N. Himes, Hugo, Okla., assignor of forty per cent to Tony Wortham, Hugo, Okla.

Application May 4, 1939, Serial No. 271,793

3 Claims. (Cl. 146—13)

The invention relates to a nut cracker and more especially to a pecan shelling tool or peeler.

The primary object of the invention is the provision of a device or tool of this character, whereby in nuts, particularly a pecan, can be acted upon for the breaking of the shell and the nipping of the end of the same to enable the meat of the nut to be acquired in an easy manner, the device or tool being of novel construction and is hand operated.

Another object of the invention is the provision of a device or tool of this character, wherein its jaws are so related to each other that a pecan can be readily broken or its shell opened in a manner to enable the meat of the same to be extracted from the fragments or broken parts of the shell without any excessive waste of the meat in that the shell of the pecan is of a peculiar interior formation pocketing the meat in such manner as to make it a difficult task to remove the meat for consumption.

A further object of the invention is the provision of a device of this character, which is of a plier type, its work-engaging jaws or blades being of a particular construction to enable the easy and quick breaking of the shell of a nut, more especially the pecan, and these jaws or blades are operated by hand levers, pivotally associated with each other, and in this association are susceptible of easy operation.

A further object of the invention is the provision of a device or tool of this character, which is simple in its construction, thoroughly reliable and efficient in operation, easy of manipulation, durable, and inexpensive to manufacture.

With these and other objects in view the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
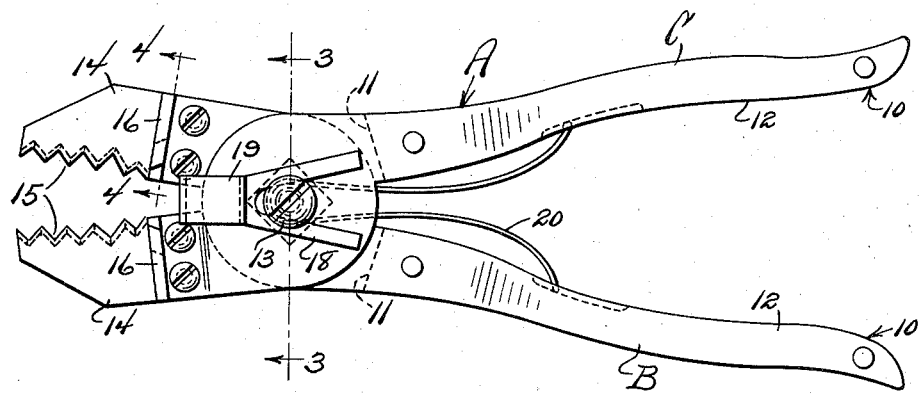
Figure 1 is a plan view of a tool constructed in accordance with the invention.
Figure 2:
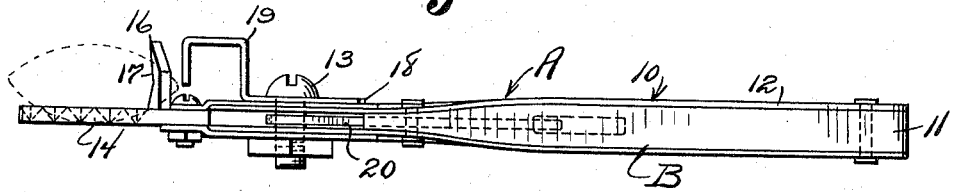
Figure 2 is an edge view thereof.
Figure 4:
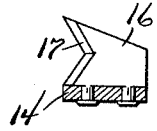
Figure 4 is a sectional view on the line 4—4 of Figure 1 looking in the direction of the arrows.
Figure 3:
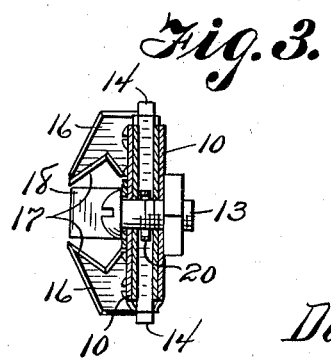
Figure 3 is a sectional view on the line 3—3 of Figure 1 looking in the direction of the arrows.
Figure 5:
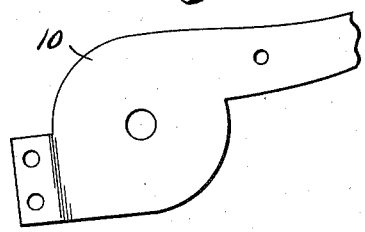
Figure 5 is a fragmentary plan view of one of the lever formations.

Referring to the drawing in detail A designates generally the tool or device constructed in accordance with the invention and comprises crossed pivotally connected levers B and C, respectively, each including a pair of matched arms 10 spaced apart by filler sections or pieces 11 therebetween, and coextensive with the handle end 12 of each lever. These filler sections or pieces are riveted to the arms 10 in their matched relation to each other. The spacing of the arms 10 10 of the respective levers B and C allows of the interfitting, one with the other in their crossed relation to each other, and the pivot at 13 swingably connects the said levers B and C together in this interfitted crossed relationship.

Detachably fastened between the arms 10 at the ends of the levers but remote from the handle ends 12 thereof are opposed flat blades or jaws 14 having inside saw toothed cutting edges 15 in confronting relation to each other and these cutting edges cooperate for the splitting or breaking of the shell of a nut when inserted between these jaws or blades 14 and the same operated on the working of the levers B and C of the device or tool.

Adjoined with the jaws or blades 14 next to the innermost ends of the cutting edges 15 and disposed crosswise of said blades or jaws to be arranged at right angles to the latter are nipping blades 16, these at the inner end edges have formed therein substantially V-shaped beveled cutting edges 17 so that the end of a shell of a nut can be nipped or cut off, this being most desirable with respect to pecans, thus enabling the nut to be cracked, broken or otherwise peeled of its shell to give forth the meat in the same or enabling easy access thereto.

Associated with the pivot 13 of this device or tool is a gage or guard, being formed with a forked stem 18 and a U-shaped abutment head 19, respectively. This guard or gage is adjustable, being held adjusted by the pivot 13 and regulates the extent of nipping action or the cutting action of the blades 16 which simultaneously open with the blades 14 in the manual operation of the device or tool. Arranged between the levers B and C is a leaf spring 20 being fitted with the pivot 13 and acts upon the said levers to spread the jaws or blades 14 apart and maintaining the same under tension. This spring normally holds the jaws or blades 14 in an open position and urging the jaws to such position on the closing of the tool or device when pressure is released from the handle ends 12 of the levers B and C thereof.

In the use of the device or tool the nut to be cracked or broken is placed conveniently between the jaws or blades 14 with the end of the shell of the nut located between the blades 16, and on the closing of the tool the shell of the nut will be cracked throughout the longitudinal extent thereof if it be a pecan, and the end nipped or cut thus giving access to the meat within the fragments of the shell.

What is claimed is:

1. In a tool of the character described, opposed thin self-opening blades having confronting saw toothed cutting edges, and supplemental blades carried by said first-named blades and at right angles thereto innermost to their cutting edges and having notch-cutting edges confronting each other, the cutting edges of the first-mentioned blades being reversely beveled to each other to present shallow sharpened pointed serrations at the sides of the said blades next to the supplemental blades.

2. In a tool of the character described, opposed thin self-opening blades having confronting saw toothed cutting edges, supplemental blades carried by said first-named blades and at right angles thereto innermost to their cutting edges and having notch-cutting edges confronting each other, the cutting edges of the first-mentioned blades being reversely beveled to each other to present shallow sharpened pointed serrations at the sides of the said blades next to the supplemental blades, and pivotally connected operating levers carrying said blades.

3. In a tool of the character described, opposed thin self-opening blades having confronting saw toothed cutting edges, supplemental blades carried by said first-named blades and at right angles thereto innermost to their cutting edges and having notch-cutting edges confronting each other, the cutting edges of the first-mentioned blades being reversely beveled to each other to present shallow sharpened pointed serrations at the sides of the said blades next to the supplemental blades, pivotally connected operating levers carrying said blades, and a gage having a forked stem adjustably fitting with the pivotal connection of said levers and coacting with the said blades.

DAVID N. HIMES.